US012684303B2

(12) United States Patent
Bernier et al.

(10) Patent No.: US 12,684,303 B2
(45) Date of Patent: Jul. 14, 2026

(54) FIELD CHECK FOR HEARING PROTECTION DEVICES

(71) Applicant: 3M INNOVATIVE PROPERTIES COMPANY, St. Paul, MN (US)

(72) Inventors: Antoine J. Bernier, Montreal (CA); Paul D. Henry, Carmel, IN (US); Alexandre J. Raymond, Montreal (CA); Jeffrey L. Hamer, Spingville, IN (US); Cameron J. Fackler, Indianapolis, IN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 240 days.

(21) Appl. No.: 18/550,735

(22) PCT Filed: Mar. 17, 2022

(86) PCT No.: PCT/US2022/020752
§ 371 (c)(1),
(2) Date: Sep. 15, 2023

(87) PCT Pub. No.: WO2022/197926
PCT Pub. Date: Sep. 22, 2022

(65) Prior Publication Data

US 2024/0187804 A1 Jun. 6, 2024

Related U.S. Application Data

(60) Provisional application No. 63/162,351, filed on Mar. 17, 2021.

(51) Int. Cl.
*H04R 29/00* (2006.01)

(52) U.S. Cl.
CPC .................................. *H04R 29/004* (2013.01)

(58) Field of Classification Search
CPC .............................. H04R 29/004; H04R 29/00
See application file for complete search history.

(56) References Cited

U.S. PATENT DOCUMENTS 5,600,729 A * 2/1997 Darlington ....... G10K 11/17857 381/72
9,532,139 B1 * 12/2016 Lu .......................... H04R 3/005
2003/0147538 A1 8/2003 Elko
(Continued)

FOREIGN PATENT DOCUMENTS

WO 2021021429 A1 2/2021

OTHER PUBLICATIONS

International Search report for PCT International Application No. PCT/US2022/020752, mailed on Jun. 28, 2022, 3 pages.

*Primary Examiner* — Daniel R Sellers
(74) *Attorney, Agent, or Firm* — Katherine M. Scholz

(57) ABSTRACT

Systems and methods for check a relative sensitivity of two or more microphones of a hearing protection device include sensing ambient sound using two or more microphones of the hearing protection device and sampling the ambient sound. The samples of the ambient sound may be used to determine whether the ambient sound is adequate for determining microphone sensitivity and to determine whether a threshold relative sensitivity of the two or more microphones is reached. A pass or fail indication may be provided to a user based on whether the threshold relative sensitivity is reached.

20 Claims, 3 Drawing Sheets

(56) References Cited

U.S. PATENT DOCUMENTS

| | | | | |
|---|---|---|---|---|
| 2005/0254665 | A1* | 11/2005 | Vaudrey | G10K 11/17853 381/72 |
| 2013/0156224 | A1* | 6/2013 | Keane | H04R 3/04 381/107 |
| 2018/0167754 | A1* | 6/2018 | Olsson | H04R 3/007 |
| 2019/0214038 | A1 | 7/2019 | Bouserhal et al. | |
| 2020/0162808 | A1 | 5/2020 | Monsarrat-Chanon et al. | |
| 2022/0109938 | A1* | 4/2022 | Jensen | H04R 25/305 |
| 2022/0150647 | A1* | 5/2022 | Antonsen | H04R 25/30 |

* cited by examiner

FIELD CHECK FOR HEARING PROTECTION DEVICES

CROSS REFERENCE TO RELATED APPLICATIONS

This application is a national stage filing under 35 U.S.C. 371 of PCT/US2022/020752, filed Mar. 17, 2022, which claims the benefit of U.S. Provisional Application No. 63/162,351, filed Mar. 17, 2021, the disclosure of which is incorporated by reference in its/their entirety herein.

SUMMARY

Embodiments described herein may provide a method for checking a relative sensitivity of two or more microphones of a hearing protection device. The method may include sensing ambient sound using the two or more microphones of the hearing protection device, sampling the ambient sound to produce a plurality of audio samples of the ambient sound, determining whether the ambient sound is adequate for determining microphone sensitivity based on the plurality of audio samples of the ambient sound, determining whether a threshold relative sensitivity of the two or more microphones is reached based on the plurality of audio samples of the ambient sound, and providing a pass or fail indication to a user based on the determining of whether the threshold relative sensitivity is reached.

In other embodiments, a hearing protection device is provided. The device may include two or more microphones and a controller. The two or more microphones may be configured to sense sound of an environment. The controller may include one or more processors and may be operatively coupled to the two or more microphones. The controller may be configured to sample ambient sound sensed by the two or more microphones to produce a plurality of audio samples of the ambient sound. The controller may further be configured to determine whether the ambient sound is adequate for determining microphone sensitivity based on the plurality of audio samples of the ambient sound and determine whether a threshold relative sensitivity of the two or more microphones is reached based on the plurality of audio samples of the ambient sound. The controller may further be configured to provide a pass or fail indication to a user based on the determining of whether the threshold relative sensitivity is reached The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawings.

BRIEF DESCRIPTION OF THE VIEWS OF THE DRAWING

Exemplary embodiments will be further described with reference to the figures of the drawing, wherein.

Figure 1:
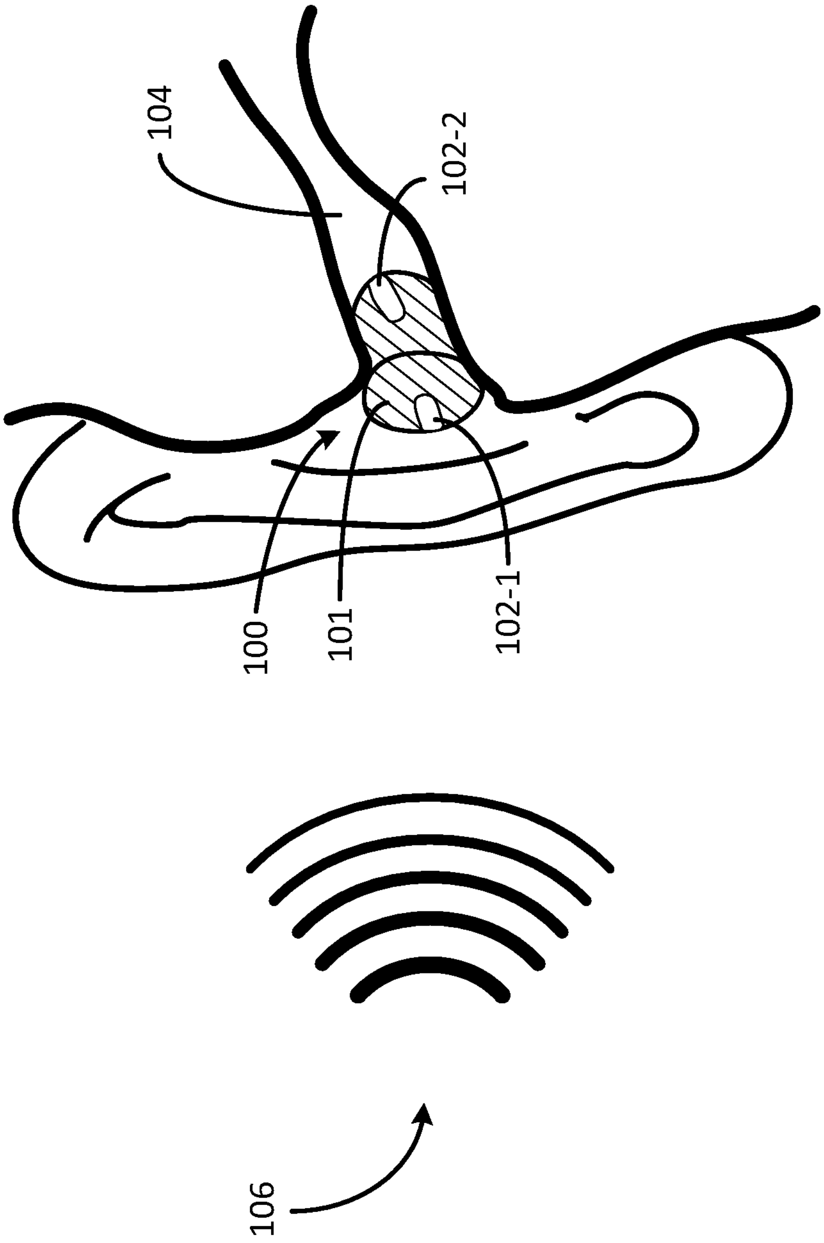
FIG. 1 is an isometric view of a hearing protection device disposed in an ear canal.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." Further, the term "and/or" (if used) means one or all of the listed elements or a combination of any two or more of the listed elements. Still further, "i.e." may be used herein as an abbreviation for the Latin phrase id est and means "that is," while "e.g.," may be used as an abbreviation for the Latin phrase exempli gratia and means "for example."

It is noted that the terms "comprises" and variations thereof do not have a limiting meaning where these terms appear in the accompanying description and claims. Further, "a," "an," "the," "at least one," and "one or more" used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure. These terms are used only to simplify the description, however, and not to limit the interpretation of any embodiment described.

Embodiments of the present disclosure are directed to checking the relative sensitivity of microphones of hearing protection devices. Such hearing protection devices may include a housing, microphones, and a controller. The controller may be operatively coupled to the microphones and configured to check the relative sensitivity of the microphones using ambient noise or sound. The controller may sample ambient noise sensed by the microphones and use the samples produced therefrom to determine whether ambient sound is adequate for determining microphone sensitivity. If the ambient sound is adequate for determining microphone sensitivity, the controller may determine whether the microphones pass or fail a relative sensitivity check by comparing a relative sensitivity of the microphones to a threshold relative sensitivity.

Systems and methods described herein may use ambient sound to model a transfer function between an outer-ear microphone and an inner-ear microphone of a hearing protection device and detect failures in one or both microphones. The terms "ambient noise" and "ambient sound" may be used interchangeably herein and may refer to background or environmental noise such as, for example, rain, water waves, traffic, noise from crowds of people, electrical noise (e.g., from refrigerators, air conditioners, power supplies, motors, etc.), extraneous speech, etc. The ambient sound used for such may be detected by the microphones of the hearing protection device when both microphones are exposed to the same acoustic environment (e.g., not being worn in a user's ear). Through a series of test criterion, systems and methods as described herein can reject disturbances rejected and detect inadequate conditions (e.g., wind, user handling, inadequate ambient sound, etc.) to provide a valid assessment of the state of the microphones of the hearing protection device.

Some standards may require that manufacturers provide a way for users to check the sensitivity of transducers (e.g., microphones) of a hearing protection device daily. Typical sensitivity checks may be performed by presenting a constant, uniform sound field to both microphones of the hearing protection device. However, some hearing protection devices may not include a speaker that can generate an appropriate sound field for both the inner-ear and outer-ear microphones.

Hearing protection devices, as described herein, may be used to protect a user's hearing via noise attenuation. However, such hearing protection devices may not properly attenuate noise if the hearing protection device is not properly fitted or disposed in the user's ear. Accordingly, the hearing protection device may include an inner-ear microphone to sense sound inside the user's ear canal and an outer-ear microphone to sense sound outside the user's ear canal when disposed in the user's ear. The sensed sound by each microphone may be used to determine a fit quality or noise attenuation. However, one or both microphones may drift in sensitivity over time; sustain damage; or have their sound port blocked due to debris, earwax, dirt, etc. If the microphones do not perform as expected, errors can be introduced to any processes or algorithms that rely on them.

A daily relative sensitivity check using ambient sound may be conducted to avoid unknowingly relying on erroneous results. Digital signal processing operations may be used to determine the presence of ambient conditions that can yield a true positive result. Such digital signal processing operations may include, for example, correlation, overall energy, energy per band, coherence, etc. The results or outputs of such digital signal processing operations may be compared to thresholds to determine whether the ambient noise is adequate for determining a relative sensitivity of the microphones. Thus, conditions that may yield a false positive result can be detected, classified (e.g., ambient sound too soft, ambient sound spectral content inadequate, disturbances such as wind or handling, etc.). Furthermore, samples of ambient noise that may yield a false positive may be rejected and additional samples may be acquired.

An exemplary hearing protection device 100, as described herein, is shown disposed in a user's ear canal 104 in FIG. 1. The hearing protection device 100 may include a body 101 and be configured to attenuate noise 106. The noise 106 may include, for example, industrial noise, loudspeaker noise, etc. The hearing protection device 100 may include microphones 102-1, 102-2 (referred to collectively as microphones 102) to sense sound of an environment. The microphones 102 may sense sound and provide a signal (e.g., electrical) indicative of the sensed sound. The hearing protection device 100 can incorporate any of the following microphone technology types (or combination of types): MEMS (micro-electromechanical system) microphones (e.g., capacitive, piezoelectric MEMS microphones), moving coil/dynamic microphones, condenser microphones, electret microphones, ribbon microphones, crystal/ceramic microphones (e.g., piezoelectric microphones), boundary microphones, PZM (pressure zone microphone) microphones, and carbon microphones.

Figure 2:
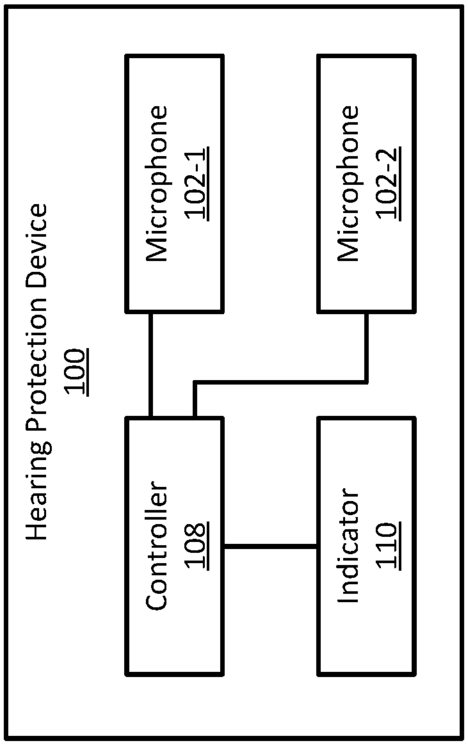
FIG. 2 is a schematic block diagram of the hearing protection device of FIG. 1.

The sound sensed by the microphones 102 may be used to determine whether the hearing protection device 100 provides adequate attenuation of noise 106 when the hearing protection device 100 is disposed in the user's ear canal 104. Furthermore, the hearing protection device 100 may include additional apparatus or circuitry to conduct relative sensitivity checks of the microphones 102. Such apparatus may include a controller 108 and an indicator as shown in the block diagram of the hearing protection device 100 depicted in FIG. 2.

The hearing protection device may include the controller 108 to check a relative sensitivity of the microphones 102. The controller 108 may be operatively coupled to each of the microphones 102 to receive signals provided by the microphones. As used herein, "operatively coupled" generally refers to a direct or indirect connection that may be wired or wireless that provides a link for power and/or communication between apparatus or systems. Wired data communication may include, or utilize, any suitable hardware connection such as, e.g., advanced microcontroller bus architecture (AMBA), ethernet, peripheral component interconnect (PCI), PCI express (PCIe), optical fiber, local area network (LAN), etc. Wireless communication may include, or utilize, any suitable wireless connection such as, e.g., Wireless Fidelity (Wi-Fi), cellular network, Bluetooth, near-field communication (NFC), optical, infra-red (IR), optical, trench bounded photons, Wireless Network-on-Chip (WNoC), etc.

The controller 108 can include any suitable hardware and/or software to execute the processes and methods for checking the relative sensitivity of microphones of a hearing protection device as described herein. The controller 108 can be implemented as one or more of a processor, multi-core processor, a digital signal processor (DSP), a microprocessor, a programmable controller, a hardware controller, a combined hardware and software device, such as a programmable logic controller, an analog-to-digital converter (ADC), a digital-to-analog converter (DAC), and a programmable logic device (e.g., field programmable gate array (FPGA), application-specific integrated circuit (ASIC)). The controller 108 can include or be operatively coupled data storage such as random-access memory (RAM), static-random access memory (SRAM), read-only memory (ROM), or flash memory.

Data storage allows for access to processing programs or routines and one or more other types of data that may be employed to carry out the exemplary methods, process, and algorithms of checking the relative sensitivity of microphones of hearing protection devices. For example, processing programs or routines may include programs or routines for performing audio sampling, disturbance rejection, coherence checks, correlation checks, cross-correlation, computational mathematics, matrix mathematics, Fourier transforms, compression algorithms, calibration algorithms, inversion algorithms, signal processing algorithms, normalizing algorithms, deconvolution algorithms, averaging algorithms, standardization algorithms, comparison algorithms, vector mathematics, or any other processing required to implement one or more embodiments as described herein.

Data may include, for example, audio samples, thresholds, graphs, arrays, meshes, grids, variables, counters, statistical estimations of accuracy of results, results from one or more processing programs or routines employed according to the disclosure herein (e.g., sound pressure level, overall energy levels, energy per band, etc.), or any other data that may be necessary for carrying out the one or more processes or methods described herein.

The controller 108 may be configured to sample ambient sound sensed by the microphones 102 and produce audio samples of the ambient sound. In other words, the controller 108 may sample the signals provided by the microphones 102 when the hearing protection device 100 is not disposed in the user's ear and all microphones 102 of the hearing protection device 100 are sensing sound of the same acoustic environment. The sampled ambient sound may include discrete points of sound data collected at a sampling rate or frequency. The controller 108 may sample the ambient sound at any suitable frequency that allows for reconstruction of a continuous sound wave signal within the range of human hearing. Such sampling frequencies may be at least 8 kilohertz.

The controller 108 may also be configured to determine whether the ambient sound sensed by the microphones 102 is adequate for determining microphone sensitivity. To determine whether the ambient sound sensed by the microphones 102 is adequate the controller 108 may analyze the audio samples of the ambient sound using one or more techniques. For example, the controller 108 may be configured to determine an overall energy of each of the microphones 102, determine a coherence function between the signals of the microphones 102, or determine a band-wise energy of each of the microphones 102. Such determined parameters may be compared to thresholds or models. For example, the controller 108 may be configured to compare the determined overall energy levels to a threshold energy level, the determined coherence to a threshold coherence, or the band-wise energies to band-wise energy thresholds.

A coherence function between the signals of the microphones may indicate a degree to which each of the microphones 102 is sensing the same noise or acoustic environment. Coherence may be determined on a scale of from 0 to 1. Perfect coherence (e.g., identical frequency and waveform and a constant phase difference) may result in a coherence equal to 1. The less coherent two signals are, the closer the coherence will be to 0. In one embodiment, the threshold coherence may be at least 0.7. The coherence may be determined or compared overall, at one or more frequencies, or one or more frequency bands. In one embodiment, the signals of the microphones are compared at frequencies of 250 Hertz or 1 kilohertz. In one embodiment, the signals of the microphones are compared at one or more frequency bands that include 250 Hertz or 1 kilohertz.

The controller 108 may be configured to adapt a filter based on the plurality of audio samples of the ambient sound. Such a filter may have a transfer function of the microphones 102 that is controlled by variable parameters. The variable parameters of the transfer function may be adjusted based on the audio samples of the ambient sound. Such adjustment may provide a filter that can take an audio sample of microphone 102-1 taken at one time period as an input and provide an output equivalent to an audio sample of microphone 102-2 at the same time period.

The controller 108 may also be configured to determine whether a relative sensitivity of the microphones is within a threshold range. To determine whether the relative sensitivity of the microphones is within a threshold range, the controller 108 may be configured to determine a sound pressure level of each of the microphones 102, determine a difference between the sound pressure levels, and compare the difference to the threshold range. The threshold range may be plus or minus (+/−) 2 dB. In one embodiment, to determine whether the relative sensitivity of the microphones is within a threshold range the controller 108 may be configured to compare the plurality of audio samples of ambient sound to a predetermined reference.

The controller 108 may be configured to provide a pass or fail indication to a user. To provide the pass or fail indication to the user the hearing protection device may include an indicator 110 operatively coupled to the controller 108. The indicator 110 may be at least partially disposed in the body 101 of the hearing protection device 100.

The indicator 110 may include any suitable device or devices for communication to or providing indications to the user. The indicator 110 may include one or more of, for example, a speaker, an emitter, a light emitting diode (LED), a vibration motor, a display, etc. In one embodiment, the indicator 110 may be configured to provide audio indications to a user, for example, a series of beeps or clicks, audible words, chimes, etc. In another embodiment, the indicator 110 may be configured to provide visual indicators to a user such as, for example, flashing a light, putting words on a display, etc. In still another embodiment, the indicator 110 may be configured to provide tactile alerts such as, for example, vibrations, pulses, etc. The controller 108 may provide an indication or an alert to the user using the indicator 110. Alternatively, the controller may be configured to transmit indications (e.g., pass or fail indications) to an external device such as, for example, a mobile computing device, a smart phone, a smart watch, a wearable device, a computer, etc.

Figure 3:
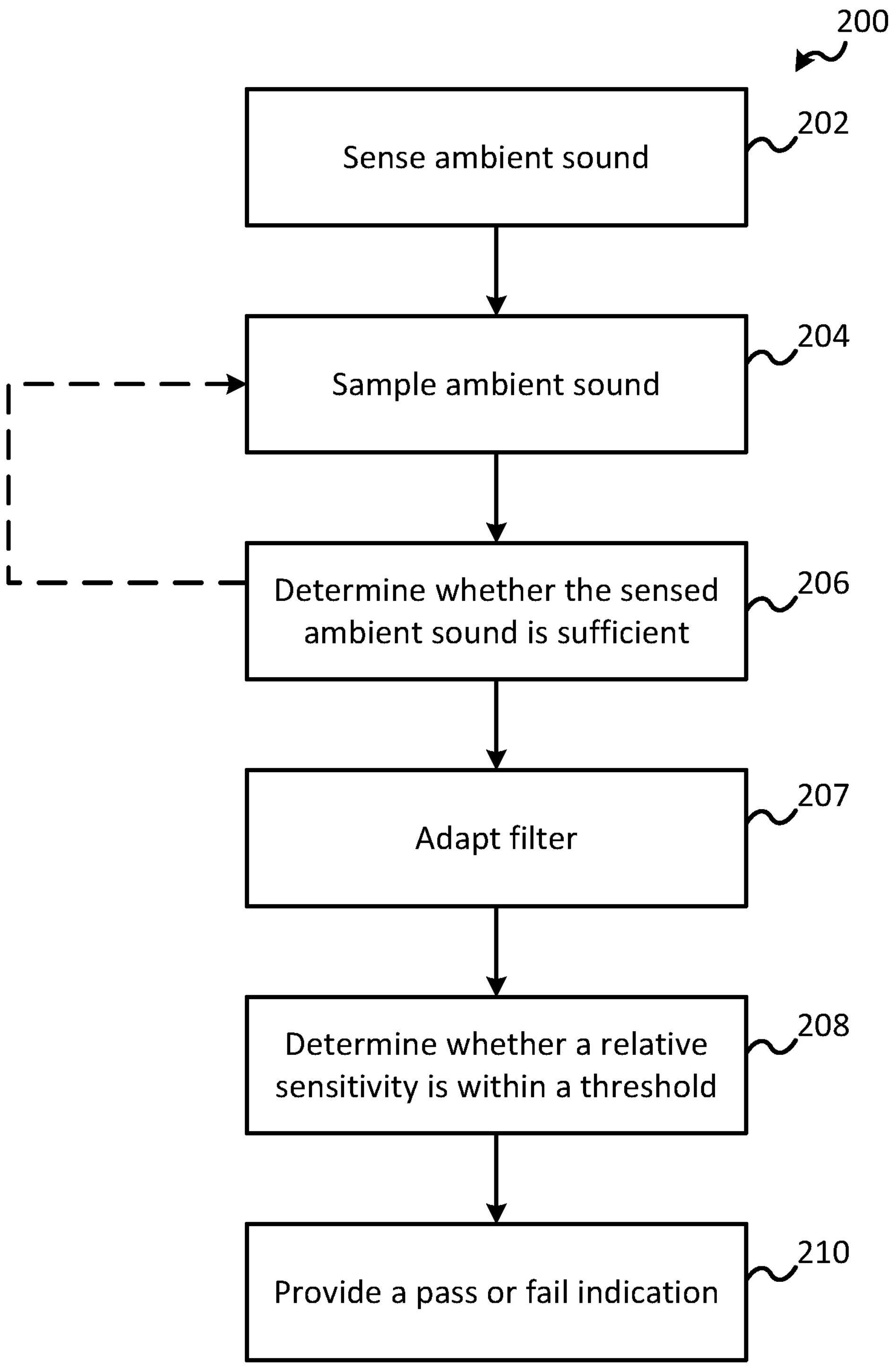
FIG. 3 is a flow diagram of a process for checking a relative sensitivity of microphones of a hearing protection device.

An exemplary method or process 200 for checking a relative sensitivity of two more microphones is depicted in FIG. 3. Although the method 200 is described in regard to the hearing protection device 100 of FIGS. 1 and 2, the method 200 may be carried out using any suitable hearing protection device. The method 200 involves sensing 202 ambient sound using the microphones 102 of the hearing protection device 100. Sensing ambient sound may be triggered or initiated by, for example, the user pressing a button, a predetermined schedule, receiving a command from an external computing device, etc.

The method 200 involves sampling 204 the ambient sound to produce a plurality of audio samples of the ambient sound. In other words, the signals provided by the microphones 102 may be sampled when the hearing protection device 100 is not disposed in the user's ear and all microphones 102 of the hearing protection device 100 are sensing sound of the same acoustic environment. The sampled ambient sound may include discrete points of sound data collected at a sampling rate or frequency. The ambient sound may be sampled at any suitable frequency that allows for reconstruction of a continuous sound wave signal within the range of human hearing. Such sampling frequencies may be at least 8 kilohertz.

The method 200 involves determining 206 whether the ambient sound is adequate for determining microphone sensitivity based on the plurality of audio samples of the ambient sound. Whether the ambient sound is adequate may be determined using one or more techniques. For example, an overall energy of each of the microphones 102 may be determined, a coherence of the microphones 102 may be determined, or a band-wise energy of each of the microphones 102 may be determined. Such determined parameters may be compared to thresholds or models. For example, the determined overall energy levels may be compared to a threshold energy level, the determined coherence may be compared to a threshold coherence, or the band-wise energies may be compared to band-wise energy thresholds. In one or more embodiments, the threshold energy level or the band-wise energy threshold is greater than 70 dB sound pressure level (SPL). Whether the ambient sound is adequate may further include checking a correlation of the microphones 102.

Determining 206 whether the ambient sound is adequate for determining microphone sensitivity may include determining a presence of one or more test invalidation conditions based on the audio samples of the ambient sound. Test invalidation conditions may include wind, user handling, inadequate ambient sound, etc. If the ambient sound is determined to be inadequate, the method may proceed to sampling 204 the ambient sound to produce another set of audio samples.

The method 200 involves adapting 207 a filter based on the audio samples of the ambient sound. The filter may compare spectrums of the signals of the microphones 102, estimate a transfer function of the microphones 102, or model the frequency response between the microphones 102. Such filter may provide be able to use an audio sample of microphone 102-1 taken at one time period as an input and provide an output equivalent to an audio sample of microphone 102-2 at the same time period.

The method involves determining 208 whether a relative sensitivity of the microphones 102 is within a threshold range. Determining whether the relative sensitivity of the microphones 102 is within a threshold range may include determining a sound pressure level of each of the microphones 102, determining a difference between the sound pressure levels, and comparing the difference to the threshold range. The threshold range may be plus or minus (+/−) 2 dB. In one embodiment, determining whether the relative sensitivity of the microphones is within a threshold range may include comparing the plurality of audio samples of ambient sound to a predetermined reference.

The method 200 involves providing 210 a pass or fail indication to a user based on the determining of whether the threshold relative sensitivity is reached. In one embodiment, the pass or fail indication may include audio indications, for example, a series of beeps or clicks, audible words, chimes, etc. In another embodiment, the pass or fail indication may include visual indicators such as, for example, flashing a light, putting words on a display, etc. In still another embodiment, the pass or fail indication may include tactile alerts such as, for example, vibrations, pulses, etc.

The techniques described in this disclosure, including those attributed to the hearing protection device, or various constituent components, may be implemented, at least in part, in hardware, software, firmware, or any combination thereof. For example, various aspects of the techniques may be implemented by the processing apparatus or controller (e.g., controller 108 as described herein), which may use one or more processors such as, e.g., one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary techniques and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, magnetic data storage media, optical data storage media, or the like. The instructions may be executed by the processing apparatus to support one or more aspects of the functionality described in this disclosure.

Illustrative embodiments are described and reference has been made to possible variations of the same. These and other variations, combinations, and modifications will be apparent to those skilled in the art, and it should be understood that this invention is not limited to the illustrative embodiments set forth herein.

What is claimed is:

1. A method to check a relative sensitivity of two or more microphones of a hearing protection device, the method comprising:

sensing ambient sound using the two or more microphones of the hearing protection device;

sampling the ambient sound to produce a plurality of audio samples of the ambient sound;

determining whether the ambient sound is adequate for determining microphone sensitivity by determining a coherence of the two or more microphones based on the plurality of audio samples of the ambient sound;

determining whether a relative sensitivity of the two or more microphones is within a threshold range based on the plurality of audio samples of the ambient sound; and providing a pass or fail indication to a user based on the determining of whether the threshold relative sensitivity is reached.

2. The method of claim 1, wherein determining whether the ambient sound is adequate for determining microphone sensitivity comprises determining an overall energy of each of the two or more microphones based on the plurality of audio samples of the ambient sound.

3. The method of claim 1, wherein determining the coherence of the two or more microphones comprises comparing spectrums of the two or more microphones at one or more frequencies based on the plurality of audio samples of the ambient sound.

4. The method of claim 3, wherein the one or more frequencies comprise 250 Hertz and 1 Kilohertz.

5. The method of claim 1, determining whether a threshold relative sensitivity of the two or more microphones is reached comprises:

determining a sound pressure level for each of the two or more microphones based on the plurality of audio samples of the ambient sound;

determining a difference between the sound pressure level of each of the two or more microphones; and determining whether the difference between the sound pressure level of each of the two or more microphones is within a threshold range.

6. The method of claim 1, wherein determining whether the relative sensitivity of the two or more microphones is reached comprises comparing the plurality of audio samples of ambient sound to a predetermined reference.

7. The method of claim 1, further comprising determining a presence of one or more test invalidation conditions based on the plurality of audio samples of the ambient sound.

8. The method of claim 1, wherein determining whether the ambient sound is adequate for determining microphone sensitivity comprises comparing the coherence to a threshold coherence.

9. The method of claim 8, wherein the threshold coherence is at least 0.7.

10. The method of claim 1, wherein determining a coherence of the two or more microphones is performed overall and in one or more frequency bands based on the plurality of audio samples of the ambient sound.

11. A hearing protection device comprising:

two or more microphones to sense sound of an environment; and a controller comprising one or more processors and operatively coupled to the two or microphones to check a relative sensitivity of two or more microphones, the controller configured to:

sample ambient sound sensed by the two or more microphones to produce a plurality of audio samples of the ambient sound;

determine whether the ambient sound is adequate for determining microphone sensitivity based on the plurality of audio samples of the ambient sound;

determine whether a relative sensitivity of the two or more microphones is within a threshold range based on the plurality of audio samples of the ambient sound; and provide a pass indication to a user based on the determining of whether the threshold relative sensitivity is reached.

12. The device of claim 11, wherein to determine whether the ambient sound is adequate for determining microphone sensitivity, the controller is configured to determine a coherence of the two or more microphones based on the plurality of audio samples of the ambient sound.

13. The device of claim 12, wherein to determine the coherence of the two or more microphones, the controller is configured to compare waveforms of the two or more microphones at one or more frequencies based on the plurality of audio samples of the ambient sound.

14. The device of claim 13, wherein the one or more frequencies comprise 250 Hertz and 1 Kilohertz.

15. The device of claim 11, wherein the controller is further configured to adapt one or more filters based on the plurality of audio samples of the ambient sound.

16. The device of claim 11, wherein to determine whether the ambient sound is adequate for determining microphone sensitivity, the controller is further configured to determine a band-wise energy of each of the two or more microphones based on the plurality of audio samples of the ambient sound.

17. The device of claim 11, wherein to determine whether a threshold relative sensitivity of the two or more microphones is reached, the controller is further configured to:

determine a sound pressure level for each of the two or more microphones based on the plurality of audio samples of the ambient sound;

determine a difference between the sound pressure level of each of the two or more microphones; and determine whether the difference between the sound pressure level of each of the two or more microphones is within a threshold range.

18. The device of claim 11, wherein to determine whether the relative sensitivity of the two or more microphones is reached, the controller is configured to compare the plurality of audio samples of ambient sound to a predetermined reference.

19. The device of claim 11, wherein the controller is further configured to determine a presence of one or more test invalidation conditions based on the plurality of audio samples of the ambient sound.

20. A hearing protection device comprising:

two or more microphones to sense sound of an environment; and a controller comprising one or more processors and operatively coupled to the two or microphones to check a relative sensitivity of two or more microphones, the controller configured to:

sample ambient sound sensed by the two or more microphones to produce a plurality of audio samples of the ambient sound;

determine whether the ambient sound is adequate for determining microphone sensitivity based on the plurality of audio samples of the ambient sound by: (i) determining, from the audio samples, band-wise energy for each microphone and requiring at least one frequency band to exceed 70 dB Sound Pressure Level, and (ii) determining inter-microphone coherence and requiring the coherence at 250 Hz and at 1 kHz to be at least 0.7;

determine whether a relative sensitivity of the two or more microphones is within a threshold range based on the plurality of audio samples of the ambient sound; and provide a pass or fail indication to a user based on the determining of whether the threshold relative sensitivity is reached.

* * * * *